UNITED STATES PATENT OFFICE.

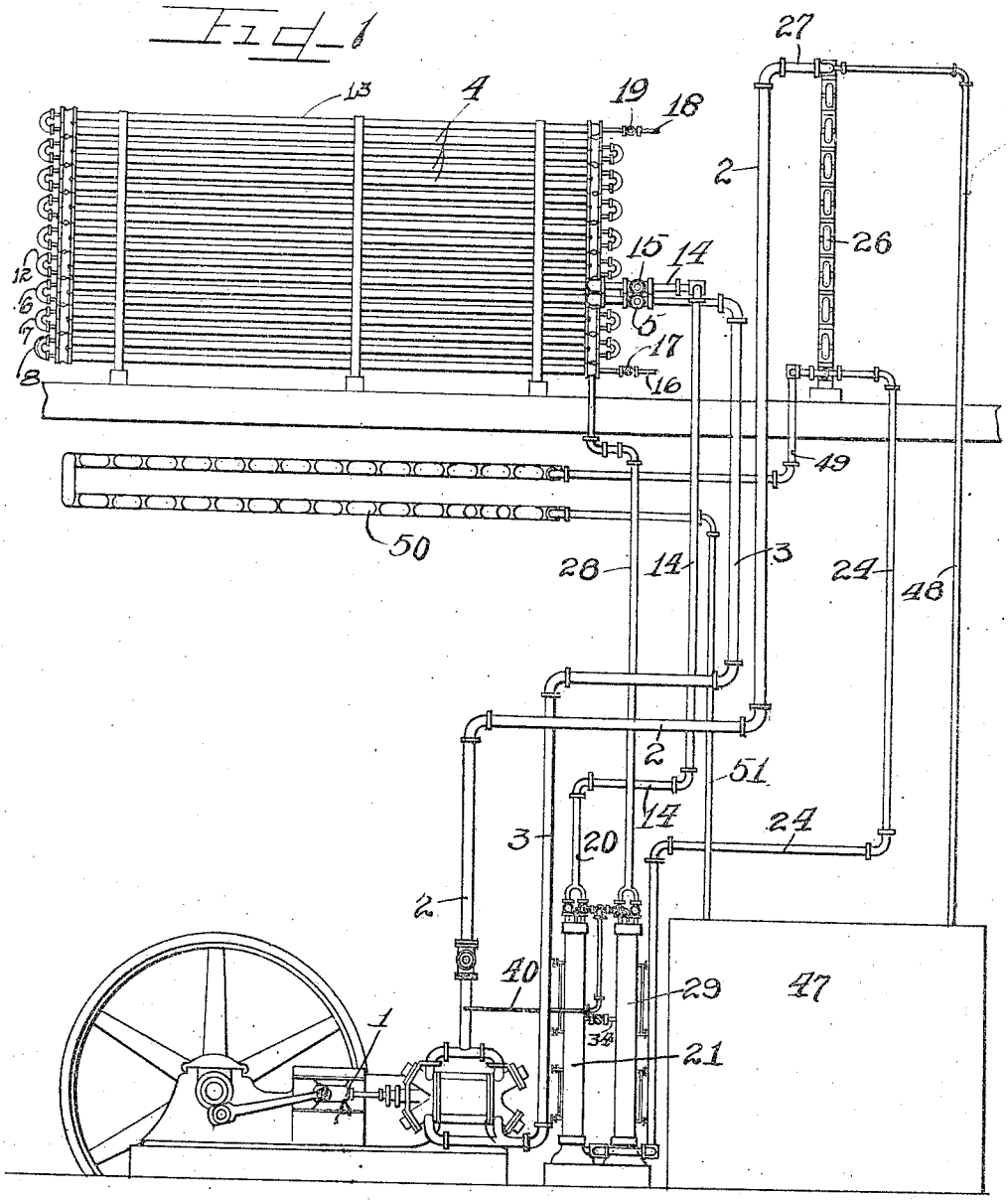

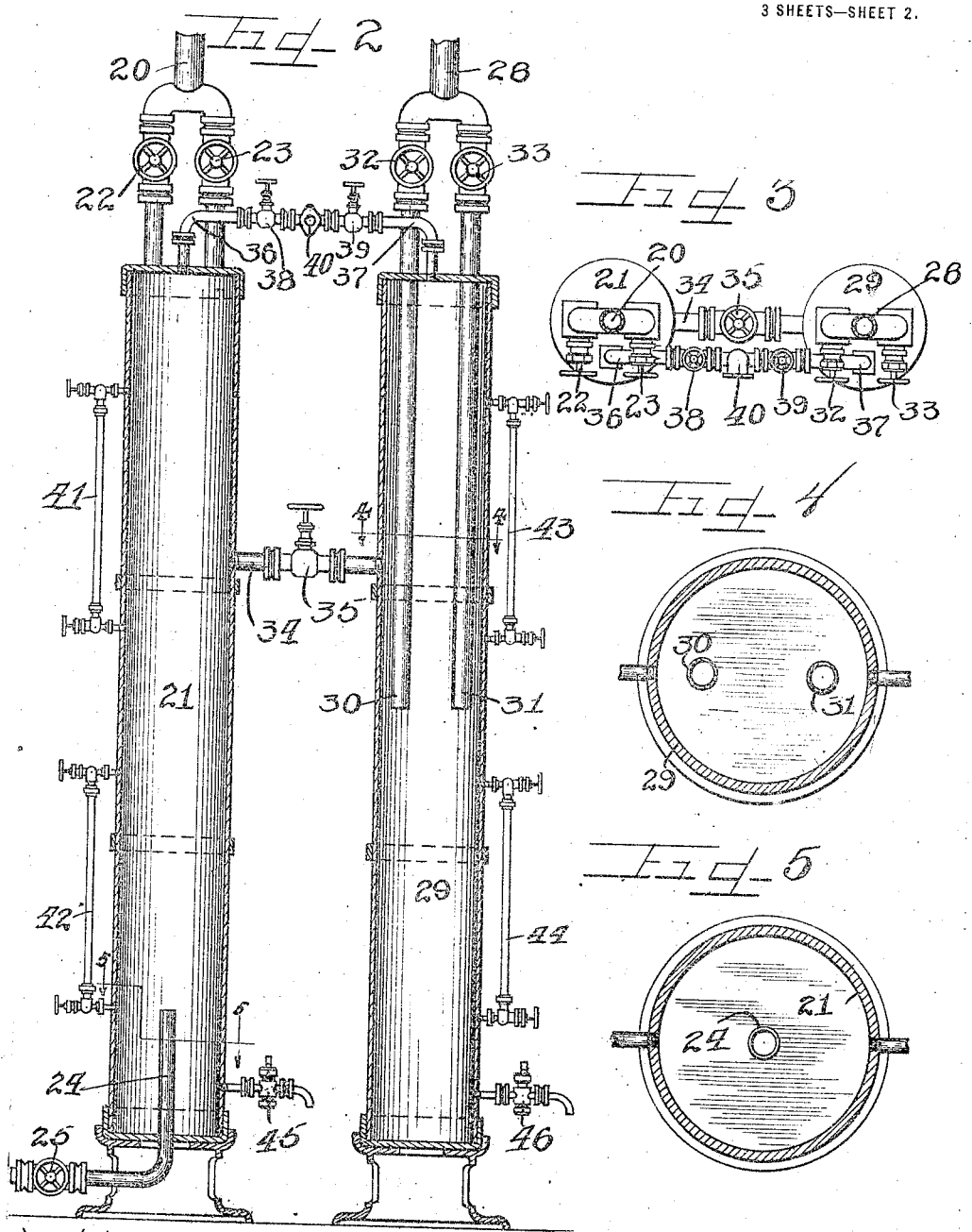

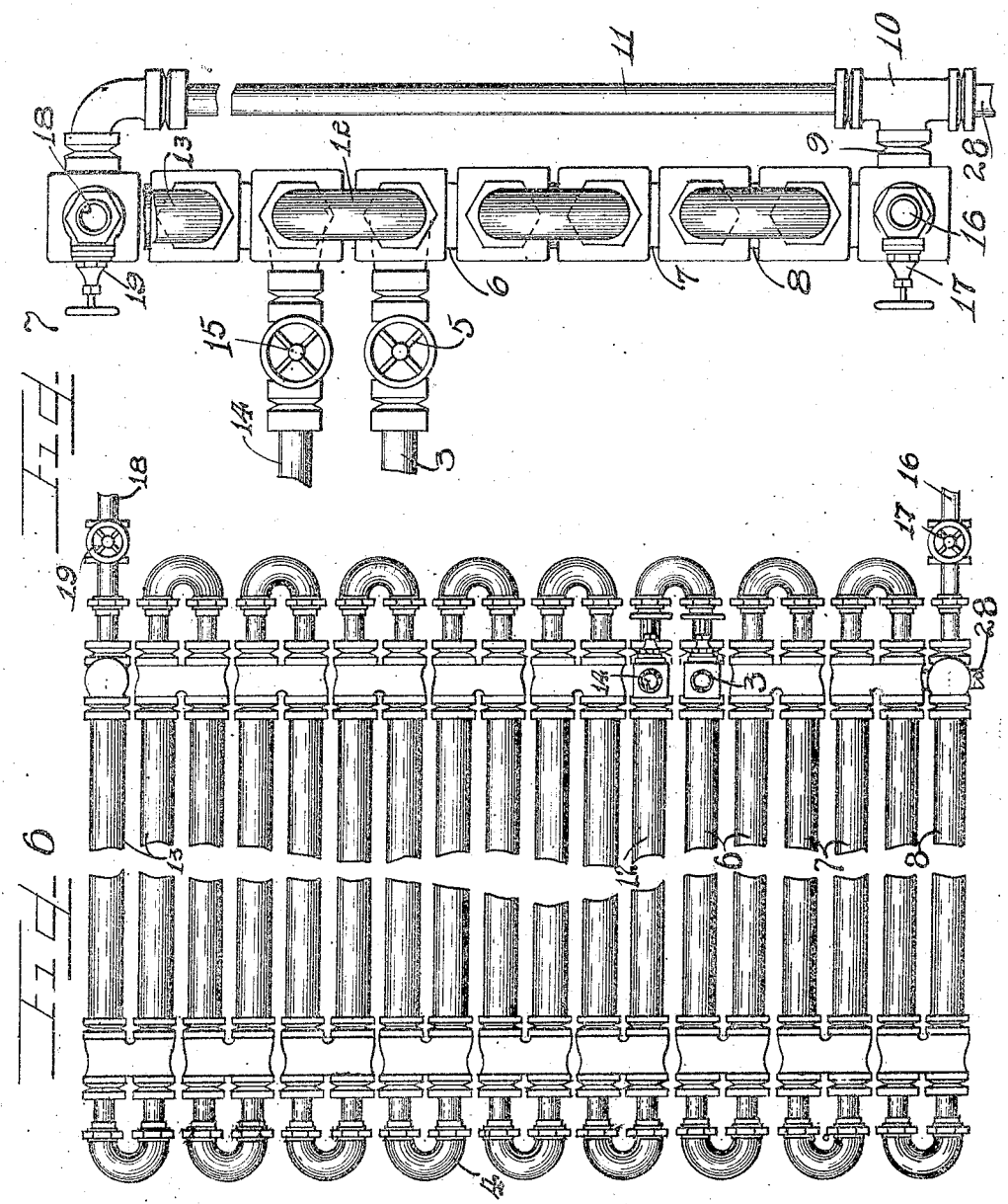

ANDREW J. JACKSON, OF CHICAGO, ILLINOIS.

REFRIGERATING APPARATUS.

1,197,636.  Specification of Letters Patent.  Patented Sept. 12, 1916.

Application filed January 2, 1915. Serial No. 42.

*To all whom it may concern:*

Be it known that I, ANDREW J. JACKSON, a citizen of the United States, and a resident of the city of Chicago, in the county of Cook and State of Illinois, have invented certain new and useful Improvements in Refrigerating Apparatus; and I do hereby declare that the following is a full, clear, and exact description of the same, reference being had to the accompanying drawings, and to the numerals of reference marked thereon, which form a part of this specification.

A serious objection in all types of refrigerating systems, both in the absorption and compression installations, is the presence of oil in the ammonia. While the oil only occurs to a small extent in the absorption system, in the compression system the great quantity of oil used in the compressor mixes with the ammonia as an impurity and causes trouble in other parts of the system. This is particularly true in the condensers, as the oil in the ammonia forms a thin film on the surfaces of the condenser pipes, and then acting as a non-conductor, prevents proper cooling of the ammonia. Various types of mechanical oil separators have been used with more or less success, but even the best designed of such devices have failed to entirely free the ammonia of the oil entrained therewith.

This invention relates to a refrigerating apparatus in which an oil receiver and a liquid ammonia receiver are utilized and connected with the ammonia condenser in a manner whereby the entrained oil is separated from the ammonia and that part of the liquid ammonia which passes into the oil receiver is subsequently removed therefrom into the cold ammonia receiver.

It is an object of this invention to construct a refrigerating apparatus wherein a novel arrangement of piping and receivers is provided to insure a separation of the oil from the ammonia after the ammonia has passed through certain of the coils of the condenser, the purified ammonia gas then passing into other of the condenser coils to be chilled and condensed and other devices acting to subsequently remove that portion of the condensed ammonia entrained with the oil and passing into the receiver.

It is also an important object of this invention to construct a refrigerating apparatus wherein receivers are provided for the cooled liquid ammonia and the oil separated from the ammonia, with connections between said respective receivers to permit removal of the liquid ammonia entrained with, and carried by the oil into the oil receiver.

It is also an object of this invention to provide a compression refrigerating apparatus with piping so arranged that the oil entrained with the ammonia leaving the compressor is separated in the first stages of the condensing apparatus and passed to a suitable oil receiver, and with a receiver for the pure cold liquid ammonia suitably connected to said oil receiver and with the condenser and compressor, so that liquor entrained with the oil and carried into the oil receiver may be removed therefrom into the liquid ammonia receiver.

It is furthermore an important object of this invention to const....t receivers for connection in a compression refrigerating apparatus, one for the condensed ammonia and the other for the oil separated therefrom, said receivers so constructed and associated with one another as to utilize the difference in the specific gravity of the liquid ammonia and the oil in accomplishing a separation of the ammonia entrained with the oil and carried into the oil receiver.

It is finally an important object of this invention to greatly improve the arrangement and construction of the elements of a compression refrigerating apparatus, introducing new elements thereinto to insure the positive purification of the liquid ammonia by the removal of the oil entrained therewith.

The invention (in a preferred form) is illustrated in the drawings and hereinafter more fully described.

In the drawings: Figure 1 is a diagrammatic view illustrating the arrangement and connection of the elements in a refrigerating apparatus embodying the principles of my invention. Fig. 2 is a central vertical section taken through the respective connected ammonia and oil receivers used in the apparatus. Fig. 3 is a top plan view of the connected receivers. Fig. 4 is a section taken on line 4—4 of Fig. 2. Fig. 5 is a section taken on line 5—5 of Fig. 2. Fig. 6 is a fragmentary front view of the ammonia condenser. Fig. 7 is a fragmentary end elevation thereof.

As shown in the drawings, the ammonia compressor is indicated as a whole by the reference numeral 1, and leading thereinto is the inlet or suction pipe 2, and leading outwardly therefrom is the outlet or ammonia pressure pipe 3. The pipe 3, containing the hot compressed ammonia leads upwardly to a double pipe condenser, indicated as a whole by the reference numeral 4, and passes through a valve 5, into a coil 6, near the lower end of said condenser, and traverses said coil 6, and also coils 7 and 8, which are below the same, leading the coil 8, at the bottom of the condenser through a pipe 9. Said pipe 9, is connected into a T 10, which has connected into one branch thereof a relatively large riser 11, leading upwardly and connected into the coil 13, at the top of the condenser. The ammonia passed into said coil 13, circulates downwardly through the succeeding coils until the coil 12, is reached, and then leaves said coil 12, through a pipe 14, provided with a valve 15.

A water inlet pipe 16, provided with a valve 17, is connected into said double flow condenser at the lower end thereof, and a water outlet pipe 18, provided with a valve 19, is connected into the uppermost coil of the condenser, the flow of water through the condenser being continuous from the coil 8, successively upwardly through the respective coils of the condenser, leaving through the uppermost coil 13. The outlet pipe 14, for the ammonia from the condenser, leads downwardly and is connected through a branch pipe 20, into the liquid ammonia receiver 21, a pair of valves 22 and 23, respectively, controlling the flow of the liquid thereinto. An outlet pipe 24, for the cold liquid ammonia, communicates upwardly through the receiver 21, to a point slightly above the bottom thereof, and is controlled by a valve 25. Said outlet pipe 24, leads upwardly from the receiver into the lowermost coil of a double pipe brine cooler 26, of standard design. The ammonia, after flowing through the brine cooler 26, leaves at the upper end thereof through an outlet pipe 27, which is connected to the suction pipe 2, of the compressor.

As the ammonia and oil entrained therewith, leave the lowermost coil 8, of the ammonia condenser and pass into the T 10, having been cooled to a certain extent, the oil, upon passing into the enlarged riser pipe 11, falls by gravity downwardly through the T 10, and through a pipe 28, which, at its lower end, branches and is connected into an oil receiver 29. Two pipes 30 and 31, respectively are connected to the branched end of the pipe 28, through valves 32 and 33, respectively, and said pipes 30 and 31, as clearly shown in Fig. 2, lead downwardly into the receiver 29, to approximately the middle thereof. As clearly shown in Fig. 2, a by-pass pipe connection 34, is provided between said respective receivers 21 and 29, at a point above the middle thereof, said by-pass having a valve 35, by which said connection may be opened and closed as desired. Also, at the upper end of each of said receivers, pipe connections 36 and 37, provided with valves 38 and 39, respectively, communicate with one another and with a pipe 40, which leads downwardly and communicates into the suction pipe 2, at a point above the compressor.

Gages 41 and 42, are provided upon the receiver 21, to indicate the level of the liquid ammonia therein and similarly, gages 43 and 44, are provided upon the receiver 29, to indicate the level of the contents of the latter. A pet cock 45, is provided at the lower end, on one side of the receiver 21, and similarly a pet cock 46, is provided upon the receiver 29, at the lower end thereof by which the contents of said receivers may be drained when so desired. The cooling brine for circulation in the apparatus is contained in a reservoir tank 47, from which a riser 48, leads to the upper end of the brine cooler 26. The brine, after passing through the cooler 26 leaves at the lower end thereof through an outlet pipe 49, by which it passes to refrigerating coils 50, and then flows by a return inlet pipe 51, to the reservoir 47.

No mechanism has been shown for circulating the brine, but, of course, any suitable pump designed for use in refrigerating systems may be used for the purpose, or even a thermo-siphon effect may be utilized.

The operation is as follows: The compressor 1, acts to compress the expanded ammonia entering therethrough through the pipe 2, and the hot compressed ammonia containing oil as an impurity passes upwardly through the pipe 3, into the coil 6, of the ammonia condenser 4, which is of the familiar double flow countercurrent type. A large quantity of cold water is pumped through said condenser, entering at the bottom and leaving at the top, the quantity of water being so great that the temperature increase is relatively small, due to the abstraction of the heat from the ammonia gas. After passing through the coils 6, and the lowermost coils 7 and 8, of the condenser, the ammonia passes through the T 10, and expands a slight amount upwardly in the riser 11, the increased area thereof causing a decrease in velocity, which permits the entrained oil to pass downwardly by gravity through the pipe 28, into the oil receiver 29. The gaseous ammonia, however, rises and passes into the condenser again through the pipe 11, which is connected to the coil 13, and after circulating downwardly therethrough is completely cooled and condensed, and then flows downwardly through the pipe 14, and is discharged into the ammonia receiver 21. The ammonia for use is drawn off through the lower end of said receiver 21, by the pipe 24, and is allowed to expand into the coils of the brine cooler 26, cooling the brine circulating therein. The brine of course flows from the brine reservoir 47, through the brine cooler 26, and after being cooled by the expanding ammonia, leaves and passes into the refrigerating coils 50, thence returning to the brine tank or reservoir 47. The oil which is separated from the gaseous ammonia as it passes upwardly through the riser 11, flows downwardly into the oil receiver 29, and of course a portion of the ammonia having been condensed, flows downwardly with the oil into said receiver, but owing to the lower specific gravity of the ammonia, the same floats upon the oil therein. This phenomena may readily be observed through the respective gages 43 and 44, and if the level of the oil within the receiver is below the by-pass 34, the valve 35, may be opened and the greater amount of the ammonia liquor skimmed or drained into the receiver 21. Any ammonia gas in the receiver 29, may be readily withdrawn therefrom by opening the valve 39, and allowing the suction from the pipe 2, to draw the same inwardly through the pipe 40, and into the compressor, and similarly any ammonia gas in the receiver 21, may also be drawn off through the pipe 40, by opening the governing valve 38. The purpose of placing the outlet pipe 24, of the ammonia receiver 21, so as to project above the lower end of the receiver, is to prevent the intake of oil through said outlet pipe, should by chance any oil find its way into the ammonia receiver, and of course sink to the bottom thereof.

I am aware that various details of construction may be varied through a wide range without departing from the principles of this invention, and I therefore do not purpose limiting the patent granted otherwise than necessitated by the prior art.

I claim as my invention:

1. In a refrigerating apparatus of the class described, a compressor, an ammonia condenser, piping connections between said compressor and the lower coils of said condenser, whereby the ammonia and oil entrained therein as an impurity are passed through the lower coils of the condenser, enlarged piping connections communicating with the lowermost coil into which the ammonia and oil flow and extending upwardly to communicate with the uppermost condenser coil, the oil separating and flowing downwardly through said piping connections by gravity and the ammonia gas flowing upwardly through said enlarged piping connections into the upper coils of the condenser, a receiver connected with the lower end of said enlarged piping connections to receive the oil therefrom, and another receiver communicating with the upper condenser coils to receive the condensed ammonia from the condenser.

2. In a refrigerating apparatus of the class described, an ammonia condenser to receive the compressed hot ammonia and oil entrained therewith, a pipe communicating with the lower condenser coils, said compressed ammonia and oil led into the lowermost coils of the condenser through said pipe, piping connections connected to the lowermost condenser coil and extending above and below the same to receive the ammonia and oil primarily cooled from said condenser, the oil and condensed ammonia falling by gravity into said piping connections and the gaseous ammonia rising therein, said piping connections connected at the upper end to the uppermost coils of said condenser to return the gaseous ammonia thereinto for further cooling, a receiver connected to the lower end of said piping connections to receive the oil falling by gravity, a second receiver connected with the upper condenser coils to receive the cooled ammonia from the condenser, and connections between said respective receivers to effect a transfer of condensed ammonia from the oil receiver into the ammonia receiver.

3. In a refrigerating apparatus of the class described, an ammonia condenser, means introducing the ammonia and entrained oil therein into the lowermost coils of said condenser, piping connections communicating with the lowermost and uppermost condenser coils and extending downwardly below said lowermost coil to receive said primarily cooled ammonia and oil, the ammonia gas rising within said piping connections and passing into the upper condenser coils and the condensed ammonia and oil falling by gravity through said piping connections, a receiver connected to the lower end of said piping connections to receive said condensed oil and ammonia, another receiver communicating with the upper condenser coils to receive the condensed cooled ammonia passed from said piping connections through said upper coils of the condenser, and connections between said respective receivers to effect a transfer of the condensed ammonia from the oil receiver into the ammonia receiver.

4. In a refrigerating apparatus of the class described, a receiver to receive the cooled compressed ammonia, a receiver to receive entrained oil separated from the ammonia, piping connections between said respective receivers at points above the middle thereof whereby condensed ammonia entrained in the oil may be passed into the ammonia receiver, and means connecting the upper ends of said receivers to effect a return of ammonia gas for re-use.

5. In a device of the class described, a compressor, an ammonia condenser, means introducing the ammonia from the compressor into certain of the coils of the condenser to primarily cool the ammonia and entrained oil therein, means communicating with the lower end of said condenser for separating the condensed ammonia and oil from the gaseous cooled ammonia, said means also leading the gaseous ammonia back into other coils of the condenser, a receiver associated with said means to receive the condensed ammonia and oil, another receiver connected with the condenser to receive the condensed cooled ammonia from the condenser, and piping connections between said receivers at a point about the middle thereof to effect a transfer of entrained condensed ammonia from the oil receiver into the ammonia receiver, and mechanisms at the upper ends of said receivers communicating with said compressor to effect a transfer of the ammonia gas in both of said receivers to the compressor.

6. In a refrigerating apparatus of the class described, a compressor, an ammonia condenser, a receiver for cooled compressed ammonia, a second receiver to receive entrained oil separated from the ammonia, said receivers arranged and mounted parallel to one another between said compressor and condenser, and means associated with said receivers to permit condensed ammonia entrained in the oil receiver to be passed into the ammonia receiver and to allow the return of ammonia gas from both of said receivers to the compressor for re-use.

7. In a refrigerating apparatus of the class described, a compressor, a condenser connected therewith, a liquid ammonia receiver and an oil receiver connected with said condenser, a pipe connecting said receivers at a point above the middle thereof, a valve in said pipe to open or close said pipe to permit a flow of liquid ammonia from said oil receiver into said ammonia receiver or stop said flow, a second pipe between the upper ends of said receivers, a plurality of valves therein one for each of said receivers, and a third pipe connected with said second pipe between said valves and leading to said compressor to permit a return of gaseous ammonia from each of said receivers, either separately or simultaneously to the compressor for re-use by adjustment of said valves in said second pipe.

In testimony whereof I have hereunto subscribed my name in the presence of two subscribing witnesses.

ANDREW J. JACKSON.

Witnesses:
   CHARLES W. HILLS, Jr.,
   FRANK K. HUDSON.